Patented Sept. 22, 1953

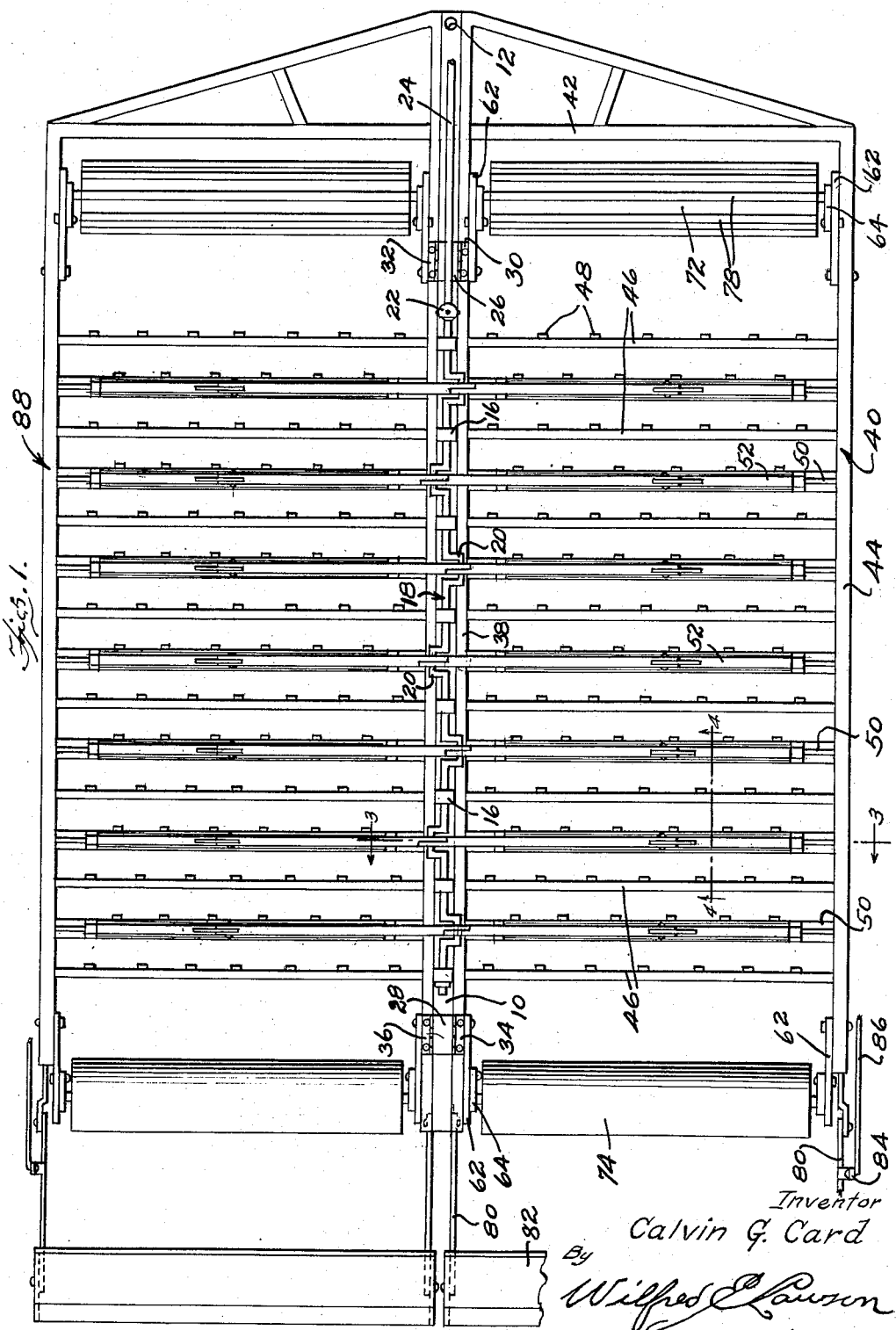

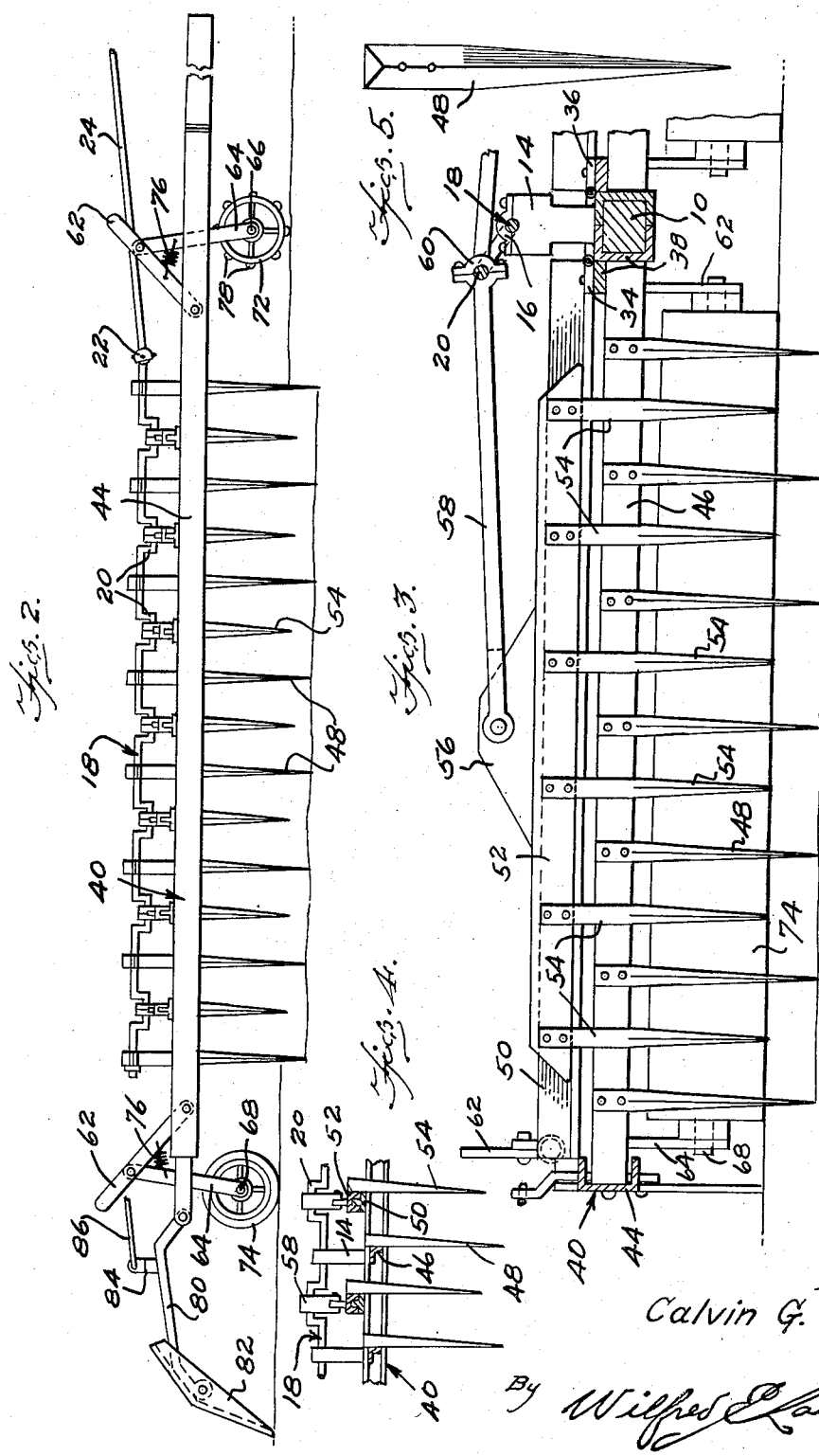

2,652,760

UNITED STATES PATENT OFFICE 2,652,760

APPARATUS FOR PREPARING SEEDBEDS

Calvin G. Card, Waukena, Calif.

Application January 10, 1951, Serial No. 205,363

4 Claims. (Cl. 97—44)

This invention relates to an apparatus for preparing a seed bed and more particularly for loosening, pulverizing and leveling the ground preparatory to planting.

The primary object of the invention is to loosen and pulverize the earth, level it and smooth it in order to preserve the moisture content thereof and facilitate the planting of seeds therein.

Another object is to enable relatively large areas of the earth to be prepared for planting with but a minimum expenditure of labor and time.

A further and more specific object is to support a group of harrow teeth in earth penetrating relation and to operate between rows of said teeth earth pulverizing blades by which the earth loosened by the teeth will be broken up to facilitate the introduction of seed thereinto.

The above and other objects may be attained by employing this invention which embodies among its features elongated rectangular frames mounted on a draw bar for movement in vertical arcs, longitudinally spaced rows of depending harrow teeth carried by each frame, cross heads mounted on the frames for transverse reciprocal movement and carrying depending earth pulverizing blades, and means carried by the draw bar for reciprocating said cross heads and moving the earth pulverizing blades.

Other features include clod breaking rollers mounted on the frames in advance of the harrow teeth and yieldingly supporting the frames adjacent their forward ends, and smoothing rollers yieldingly supported on the frames adjacent their rear ends for smoothing and leveling the earth loosened and pulverized by the teeth and blades, and a scraper mounted on the rear end of each frame for smoothing the earth which has been traversed by the smoothing rollers.

In the drawings:

Figure 1 is a top plan view of apparatus for preparing a seed bed, embodying the features of this invention;

Figure 2 is a side view of the apparatus illustrated in Figure 1;

Figure 3 is a transverse sectional view taken substantially along the line 3—3 of Figure 1;

Figure 4 is a fragmentary longitudinal sectional view taken substantially along the line 4—4 of Figure 1; and Figure 5 is a perspective view of one of the teeth employed with this invention.

Referring to the drawings in detail this improved apparatus for preparing a seed bed comprises an elongated draw bar designated 10 which is provided adjacent one end with an opening 12 for connecting the draw bar to any suitable traction device such as a farm tractor. The draw bar 10 is provided at longitudinally spaced intervals with upwardly extending supports 14 carrying at their upper ends aligned bearings 16 in which a crank shaft designated generally 18 is mounted to rotate. The crank shaft 18 is provided intermediate the standards 14 with cranks 20, and carried by the crank shaft adjacent the end of the draw bar 10 having the opening 12 therein is a universal joint 22 by which a drive shaft 24 is coupled to the crank shaft for rotating it in the bearings 16. This drive shaft 24 is provided with any suitable means (not shown) for coupling it to the power take-off of a conventional farm tractor or other suitable prime mover. Fixed to the draw bar 10 adjacent opposite ends are hinge leaves 26 and 28 to opposite side edges of which are coupled in any conventional manner hinge leaves 30, 32 and 34 and 36 the purpose of which will hereinafter appear.

Secured in any conventional manner to the hinge leaves 30 and 34 on one side of the draw bar 10 is one longitudinal side bar 38 of an elongated frame designated generally 40. Secured to and extending laterally from the side bar 38 adjacent the end of the draw bar having the opening 12 therein is a transversely extending bar 42, and extending perpendicularly from the bar 42 at the end thereof remote from the side bar 38 is a longitudinally extending side bar 44 which lies parallel to the side bar 38 as will be readily understood upon reference to Figure 1. Secured to the bars 38 and 44 and extending transversely therebetween are longitudinally spaced parallel tooth supporting bars 46 to which are riveted or otherwise rigidly secured vertically extending transversely spaced harrow teeth 48. Secured to the side bars 38 and 44 and extending transversely therebetween intermediate the supporting bars 46 are guide bars 50. As illustrated in Figures 3 and 4, the guide bars 50 are disposed above the level of the supporting bars 46.

Mounted for longitudinal sliding movement on the guide bars 50 are cross heads 52 which in the preferred form of the invention comprise inverted channels, and riveted or otherwise secured to the outer side of one side flange of each channel 52 are earth pulverizing knives 54 of the same size and shape as the teeth 48. It will thus be seen that the lower ends of the knives 54 operate above the level of the lower ends of the teeth 48 so that as earth is loosened by the teeth 48 the knives moving with their cross heads 52 will serve to pulverize the earth so loosened. Extending upwardly from each cross head 52 is an ear 56 to which is pivotally connected one end of a connecting rod 58, the opposite end of which is provided with a suitable coupling 60 for connection to a crank 20 of the crank shaft 18. It will thus be seen that as the crank shaft 18 is rotated in its bearings 16, the cross heads 52 will be reciprocated on their respective guide bars 50 so as to cause the knives 54 to move transversely of the machine and relative to the teeth 48.

Pivotally connected to the side bars 38 and 44 adjacent their forward and rear ends are upwardly and outwardly extending arms 62, and pivotally connected to the arms 62 intermediate their ends are downwardly extending lever arms 64 carrying adjacent their lower ends openings for the reception of trunnions 66 and 68 respectively of a clod breaking roller 72 and a smoothing roller 74. A suitable retractile coil spring 76 is connected at opposite ends to each arm 62 and lever 64 in order that the frame 40 may be yieldingly supported by the rollers. The clod breaking roller 72 is provided on its periphery with longitudinally extending ribs 78 and is located at the end of its respective frame adjacent the opening 12 in the draw bar 10. It will thus be seen that with the draw bar 10 coupled to any suitable traction means it may be advanced along its longitudinal axis, thus causing the rollers 72 and 74 to yieldingly support the frame 40 in spaced relation to the surface being traversed.

Pivotally supported on the side bars 38 and 44 adjacent their rear ends are arms 80, and mounted between said arms is a scraper blade 82 which is adapted to ride on the surface of the ground after it has been traversed by the machine in order to smooth it preparatory to the planting of seeds therein. An upright 84 is carried by each arm 80 and has coupled thereto a suitable cable or link 86 which extends forwardly above the apparatus to a position near the operator's station of the traction device so that the blade may be raised or lowered without requiring that the operator dismount from the tractor or other traction device.

A frame designated generally 88 which corresponds in all respects to the frame 40 is coupled to the leaves 32 and 36 of the hinge leaves 26 and 28 respectively and operates on the side of the draw bar 10 remote from the frame 40. Like the frame 40, the frame 88 is also equipped with transversely extending supporting bars carrying depending teeth corresponding to the depending teeth 48 and cross heads and knives corresponding to the cross heads and knives 52 and 54 respectively. The cross heads of the frame 88 are also coupled to the cranks 20 of the crank shaft 18 through connecting rods similar to those previously described. The frame 88 is also provided with a clod breaking roller and a smoothing roller, corresponding to the rollers 72 and 74 and a scraper blade corresponding to the blade 82 which like the blade 82 is also capable of being elevated by the operator of a traction vehicle coupled to the draw bar 10.

In use with the draw bar 10 coupled to a conventional farm tractor having a power take-off, the drive shaft 44 is coupled to the power take-off so that when the latter is operated, the crank shaft 18 will rotate in its bearings. As the tractor advances, the teeth 48 will dig in the surface of the ground so as to loosen it and with the crank shaft 18 rotating in its bearings 16, the cross heads 52 and those carried by the frame 88 will be reciprocated so as to move their respective teeth 54 transversely of the direction of travel of the machine to thus pulverize the earth which has been loosened by the teeth 48. As the device advances, any clods encountered by the roller 72 and its companion roller carried by the frame 88 will be broken preparatory to their engagement with the teeth 48 and the pulverized ground will be leveled by the roller 74 and its companion roller carried by the frame 88 and eventually smoothed by the blade 82 and its companion blade carried by the frame 88. By manipulating the cables 86, the blade 82 and its companion blade carried by the frame 88 may be elevated or held in such position as to lightly engage the surface which has been leveled by the roller 74 and its companion roller so that the surface of the ground can be properly prepared for planting. Owing to the yielding support of the frames 40 and 88 on their respective rollers 72 and 74 it will be evident that the frames may rise or fall as determined by the variations of the hardness of the ground encountered by the teeth as the earth preparing operation progresses.

While in the foregoing there has been shown and described the preferred form of this invention, it is to be understood that minor changes in the details of construction, combination and arrangement of parts may be resorted to without departing from the spirit and scope of the invention as claimed.

I claim:

1. Apparatus for preparing a seed bed comprising a draw bar, an elongate rectangular frame hinged to each side of the draw bar for vertical swinging movement on an axis parallel to the draw bar, ground engaging means connected to and supporting each frame, longitudinally spaced transversely extending rows of depending harrow teeth carried by and fixed to each frame, cross heads mounted on the frames for transverse reciprocal movement, depending earth pulverizing blades carried by the cross heads for movement therewith relatively to the fixed harrow teeth, and means carried by the draw bar and connected to the cross heads for reciprocating said cross heads and moving the earth pulverizing blades.

2. The invention as set forth in claim 1, wherein said fixed harrow teeth have their ground penetrating points extending downwardly a substantial distance beyond the points of the earth pulverizing blades.

3. The invention as set forth in claim 2, wherein said earth pulverizing blades are arranged in rows alternating with the rows of fixed harrow teeth.

4. Apparatus for preparing a seed bed comprising a draw bar, an elongate rectangular frame hinged to each side of the draw bar for vertical swinging movement on an axis parallel to the draw bar, longitudinally spaced transversely extending rows of depending harrow teeth carried by and fixed to each frame against movement independently thereof, cross heads mounted on the frames for transverse reciprocal movement, depending earth pulverizing blades carried by the cross heads for movement therewith relatively to the fixed harrow teeth, means carried by the draw bar and connected to the cross heads for reciprocating said cross heads and moving the earth pulverizing blades, arms pivotally connected to each of the frames adjacent to opposite ends thereof and extending upwardly and longitudinally therefrom, a lever pivotally connected to each arm and extending downwardly, a ground engaging element rotatably supported by and between the levers at each end of the frame and supporting the frame, and springs connected between the connected arms and levers to yieldingly hold said elements in position relatively to the frames.

CALVIN G. CARD.

References Cited in the file of this patent

UNITED STATES PATENTS

| Number | Name | Date |
|---|---|---|
| 400,351 | Michael | Mar. 26, 1889 |
| 826,137 | Balyeat | July 17, 1906 |
| 1,523,084 | Scheunemann | Jan. 13, 1925 |
| 1,756,820 | Gaubatz | Apr. 29, 1930 |
| 2,210,223 | Taylor | Aug. 6, 1940 |

FOREIGN PATENTS

| Number | Country | Date |
|---|---|---|
| 22,398 | Netherlands | June 17, 1930 |